(12) United States Patent
Ratner

(10) Patent No.: US 11,774,302 B2
(45) Date of Patent: Oct. 3, 2023

(54) SENSOR APPARATUS

(71) Applicant: Cary Ratner, East Hills, NY (US)

(72) Inventor: Cary Ratner, East Hills, NY (US)

( * ) Notice: Subject to any disclaimer, the term of this patent is extended or adjusted under 35 U.S.C. 154(b) by 260 days.

(21) Appl. No.: 17/249,894

(22) Filed: Mar. 17, 2021

(65) Prior Publication Data

US 2022/0299386 A1   Sep. 22, 2022

(51) Int. Cl.
*G01L 1/22*  (2006.01)
*G01L 1/16*  (2006.01)
*G01K 7/02*  (2021.01)
*G01L 9/00*  (2006.01)

(52) U.S. Cl.
CPC ............ *G01L 1/2281* (2013.01); *G01K 7/02* (2013.01); *G01L 1/16* (2013.01); *G01L 9/008* (2013.01)

(58) Field of Classification Search
CPC ......... G01L 1/2281; G01L 1/16; G01L 9/008; G01L 1/2275; G01L 7/08; G01L 1/00; G01L 7/00; G01K 7/02; G01D 3/024
See application file for complete search history.

(56) References Cited

U.S. PATENT DOCUMENTS

| 2009/0185169 A1* | 7/2009 | Ramsden | G01N 21/45 356/477 |
| 2013/0023775 A1* | 1/2013 | Lamego | A61B 5/14552 600/479 |
| 2019/0080573 A1* | 3/2019 | Mieko | G08B 29/185 |
| 2021/0191554 A1* | 6/2021 | Jun | G06F 3/0443 |

* cited by examiner

*Primary Examiner* — Michael C Zarroli

(57) ABSTRACT

A sensor apparatus, such as a pressure gauge, comprises a sensor arranged to produce a sensor output signal that varies with a measured parameter such as pressure, and a plurality of output channels each arranged to receive the sensor output signal. The output channels are each optimized for a different range of the measured parameter. The apparatus further comprises an analog to digital converter (ADC) and control module arranged to select one of the output channels and connect it to the ADC so as to produce a digital channel output, and an output module configured to generate an output reading from the digital channel output of the selected channel.

16 Claims, 1 Drawing Sheet

SENSOR APPARATUS

FIELD OF THE INVENTION

The present invention relates to sensor apparatus, and in particular to sensor apparatus which is operable over a wide range of values. It has application in piezoelectric sensor based apparatus such as pressure gauges and force sensors, but also in sensor apparatus comprising strain gauges, and temperature sensors, as well as other sensors that produce an electrical output.

BACKGROUND TO THE INVENTION

Sensors are used for a wide variety of applications. Typically, a sensor apparatus, such as a pressure gauge, comprises a sensor in the form of a transducer or other device which outputs an electric signal that varies with the quantity being measured. The sensor apparatus typically also comprises a signal conditioning circuit which may include an amplifier, filters and linearisers, and an analogue to digital converter (ADC) arranged to generate a digital output from the conditioned analogue signal.

While the sensor may be able to generate an output signal over a wide range of the measured parameter, the variation in magnitude of the signal and its non-linearity mean that the signal conditioning circuit cannot provide an accurately linear conditioned output over the full range of the sensor. Therefore if accurate readings are required, it is conventional, for example with pressure gauges, to have a number of completely different sensors or gauges with different ranges.

US2010024517A1 describes a pressure gauge which includes two pressure sensors, each arranged for use over a different pressure range, conditioning circuitry arranged to produce two conditioned outputs, one from each sensor, and a controller which is arranged to switch between the conditioned outputs at a threshold pressure.

SUMMARY OF THE INVENTION

The present invention provides a sensor apparatus comprising a sensor arranged to produce an output signal that varies with a measured parameter, a plurality of output channels each arranged to receive the sensor output signal. Each of the channels may comprise respective conditioning means arranged to condition the output signal. The output channels each may be optimized for a different range of the measured parameter. The sensor apparatus may further comprise an analogue to digital converter (ADC) having an analogue input and a digital output. The sensor apparatus may further comprise control means arranged to select one of the output channels and connect it to the ADC, and to generate an output reading from the output of the ADC.

The control means may be arranged to select one of the output channels based on a signal on one of the channels. That signal may be a digital output signal from at least one of the channels.

The sensor apparatus may comprise an output unit arranged to generate a sensor apparatus output, which may be indicative of the measured parameter. The output unit may be arranged to generate the sensor apparatus output from the channel output signal of the selected one of the channels. The sensor apparatus may further comprise switch means associated with each of the channels. Each of the switch means may be arranged to selectively connect one of the channels to the output unit. The control means may be arranged to monitor the signal on a selected one of the channels to detect when that signal is outside an optimum range, and in response to select another of the channels as the selected channel. This can enable the sensor apparatus to switch been channels whenever required so that the optimum channel is selected. The monitored signal may be a digital channel output signal, or it may be an analogue or digital signal at some other part of the channel. Alternatively the control means may be arranged to monitor the signal on each of the channels, for example sequentially in a series of monitoring cycles, to identify the optimum channel, and after each cycle to select the optimum channel.

Each of the output channels may comprise an amplifier. Each of the amplifiers may have a gain which is different from that of the amplifiers of the other channels.

Each of the output channels may comprise linearising means arranged to compensate for non-linearity between the output signal and the measured pressure. Each of the linearising means may provide different compensation from the other linearising means.

Each of the output channels may comprise at least one filter. The at least one filter of each of the output channels may be different from the at least one filter of the other output channels.

Each of the output channels may comprise temperature compensation means arranged to compensate for variations in the output signal caused by variations in temperature. The temperature compensation means of each of the channels may be different from the pressure compensation means of the other channels.

Each of the channels may be arranged to generate an analogue output. The ADC may be connected between the analogue output and the output means. Alternatively each of the channels may comprises an analogue section and a digital section. The sensor apparatus may further comprise switching means arranged selectively to connect the ADC between the two sections of each of the channels.

It will be appreciated that the ranges of the different channels can be selected appropriately depending on the total range of the measured parameter that needs to be measured, and the accuracy with which it needs to be measured. For example the gains, and hence sensitivities, of the channels may increase in factors of ten, or they may increase in factors of five or two. The number of channels can also be selected depending on the accuracy and the range required of the sensor apparatus. For example it may be two or three, or it may be five or ten.

The sensor apparatus may further comprise any one or more features, in any workable combination, of the embodiments of the invention which will now be described by way of example only with reference to the accompanying drawings.

DESCRIPTION OF THE PREFERRED EMBODIMENTS

Figure 1:
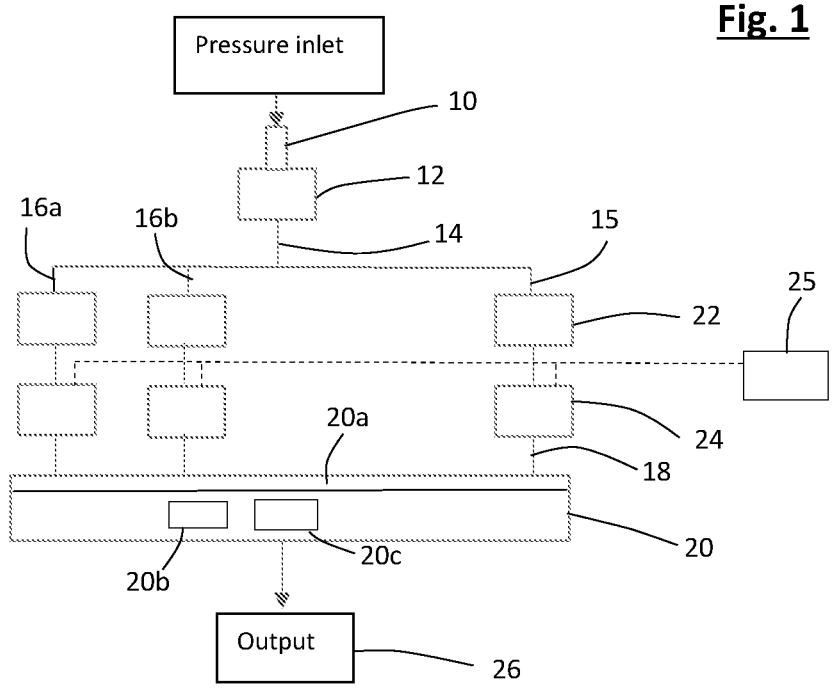
FIG. 1 is a diagram of a sensor apparatus according to a first embodiment of the invention.

Referring to FIG. 1, a sensor apparatus, which in this case is a pressure gauge, comprises a pressure inlet 10 which is arranged to be exposed to a fluid (i.e. a liquid or a gas), the pressure of which is to be measured, for example by being connected to a fluid container or conduit, and a pressure transducer 12 which is exposed to the fluid in the fluid inlet 10. The pressure transducer 12 has an electrical output 14 and is arranged to output an analogue electrical output signal, the voltage of which varies with the fluid pressure in the fluid inlet 10. For example the pressure transducer 12 may comprise a diaphragm which is exposed to the fluid, and a piezoelectric crystal which is physically connected to the diaphragm, so that force applied to the diaphragm is applied to the piezoelectric crystal, and arranged to output an analogue signal that varies with the force applied to the diaphragm. It will be appreciated that for other measured parameters the transducer may be of a different type altogether, or may be a piezoelectric transducer set up to measure a different parameter such as strain or temperature.

The output 14 of the transducer 12 is connected to the input 15 of each of a plurality of signal processing channels 16a, 16b which are arranged in parallel and each have an output 18 at which it generates a digital channel output signal. Each of the outputs 18 is connected to a common comparator unit 20 which is arranged to analyse the outputs from all of the channels 16a, 16b etc. and select one of them from which the pressure reading output is to be generated. The comparator unit 20 comprises a switching unit 20a, an analogue to digital converter (ADC) 20b and a control unit 20c. The switching unit 20a comprises a number of switches, and is arranged to connect each of the channel outputs 18 to the ADC 20b in turn, under control of the control unit 20c, to generate respective digital channel outputs. The control unit 20c is arranged to receive and compare the digital channel outputs to identify and select the one which will provide the most accurate gauge output, and transmit that selected digital channel output to a gauge output unit 26, together with a channel identifier which identifies which of the channels generated the selected digital channel output. The gauge output unit 26 is arranged to generate a gauge output from the selected digital channel output signal and the channel identifier. The gauge output is arranged to indicate the measured pressure over the full range of the gauge.

The optimum channel may be selected by identifying one of the channel output signals as being within an optimum range, or as being closest to an optimum value.

Each of the signal processing channels 16a, 16b, etc. comprises an amplification unit 22, and a filtering and linearization unit 24. Each of the channels is optimized for a different part of the full range of the output signal from the transducer 12. For example, if the pressure gauge is arranged to measure pressures up to a maximum pressure $P_{max}$, at which the transducer generates an output signal $V_{max}$, and the ADC 20b has an N bit output with a maximum output value of $2^N-1$, then the least sensitive channel 16a has its amplification set so that the maximum transducer output $V_{max}$ gives a digital output value of $2^N-1$. The most sensitive channel will have greater amplification and may for example be arranged to measure pressures up to 0.001 $P_{max}$. The gain $G_{max}$ may therefore be approximately 1000 times the gain $G_{min}$ of the least sensitive channel. In this channel the gain may therefore be set so that a pressure of 0.001 $P_{max}$ gives a digital output of $2^N-1$. For example, if $N=16$ then $2^N-1=32767$. The filtering and linearization unit in the most sensitive channel is optimized for the response of the pressure transducer 12 over the pressure range from 0 to 0.001 $P_{max}$. Other channels may be optimized to measure pressures up to 0.1 $P_{max}$ and 0.01 $P_{max}$, for example, and their respective gains set at 10 times $G_{min}$ and 100 times $G_{min}$ respectively. For any measured pressure, the optimum channel may be defined as the one which generates an ADC output closest to the maximum value, which in this example would be 32767. Alternatively, since in this example each channel covers the lowest 10% of the range of the next channel, the optimum channel may be defined as the one which produces an ADC output in the top 90% of the range of the ADC. The optimum range will obviously vary depending on the relationship between the gains of the different channels.

The filtering and compensation unit 24 of each of the channels may also be connected to a thermometer 25 and may be arranged to provide temperature compensation to compensate for the effect of temperature on the transducer output signal. This temperature compensation may also be different in each of the channels and optimized for the range of pressures for which the channel is optimized.

In the embodiment of FIG. 1, the filtering and linearization as well as the amplification are performed in the analogue domain.

The gauge output may be arranged to output the pressure measurement in any appropriate way. For example, the gauge output may comprise a digital display and may be arranged to indicate the measured pressure on the digital display in any appropriate units. Alternatively the gauge output may be arranged to generate an analogue signal that varies continuously and linearly with the measured pressure over the full range of the gauge.

In operation the controller 20c is arranged to connect each of the channels to the ADC 20b in turn in each of a series of switching cycles, and in each cycle to monitor the digital output generated from each of the channels to identify the optimum channel. It is then arranged to transmit the digital output signal from the selected optimum channel to the output unit 16 together with a channel identifier identifying the selected channel. The output unit 16 is then arranged to generate the pressure gauge output from the digital channel output and the channel identifier. For example the output unit may define a range of output values associated with each of the channels, which will depend on the gain of each of the channels, and may identify an output value within that range on the basis of the digital channel output.

Figure 2:
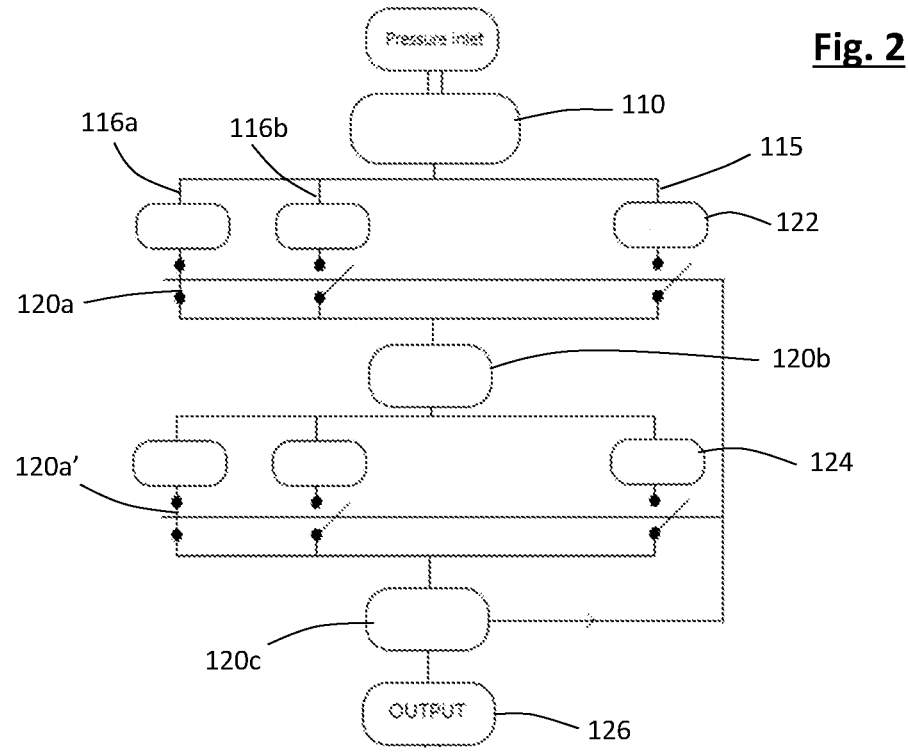
FIG. 2 is a diagram of a sensor apparatus according to a second embodiment of the invention.

Reference is now made to FIG. 2, in which a second embodiment of the invention is shown with components corresponding to those in the first embodiment indicated by the same reference numerals increased by 100. The pressure inlet 110 is connected to the inputs 115 of the channels 116a, 116b in a similar way to the first embodiment. However each channel is in two sections. The first section includes an amplifier 122 and has an analogue output which is connected to the input of a common ADC 120b. The second section is connected to the output of the common ADC 120b and includes the filtering and linearisation unit 124. The output of the second section of each of the channels is connected to the control unit 120c. The switching is provided by a separate switch 120a for the first section of each of the channels and another switch 120a' for the second section of each of the channels. The control unit 120c is arranged to control the switches so that the first and second sections of any one of the channels can be closed to connect a selected one of the channels and the ADC 120 between the inlet 110 and the control unit 120c. This means that the filtering and linearisation, and temperature compensation if present, is performed in the digital domain, and the amplification is performed in the analogue domain.

In operation the control unit 120c may first be arranged to connect the first channel 116a with the lowest sensitivity and lowest gain to the inlet 110, and to monitor the digital output of that channel 116*a*. If it is within an optimum output range, for example an upper part of the ADC digital output range, then the control unit 120*c* is arranged to input that digital output to the output unit 126. However if the digital output of the lowest sensitivity channel is below the optimum output range, then the control unit 120*c* is arranged to disconnect the first channel 116*a* and connect the second channel 116*b* between the pressure inlet 110 and the control unit 120*c*. The control unit 120*c* is then arranged to monitor the digital output of the second channel to determine whether or not it is within the optimum output range. If it is, then the control unit 120*c* is arranged to input the digital output from the second channel 116*b* to the output unit 126, but if not, the control unit 120*c* is arranged to continue switching in each of the remaining channels in turn until one of the channels which is producing an output in the optimum range is identified, and then connected to the output unit 126.

In a further embodiment the apparatus is a piezoelectric load cell arranged to measure the load or force on a component. In this case the piezoelectric element is acted on directly by a force input member such as a rod, rather than a diaphragm as may be used in a pressure gauge. Otherwise the apparatus operates in a similar manner to the pressure gauge described above, with the output being indicative of the load applied to the load cell.

In a further embodiment the apparatus is a load cell with a strain gauge as the sensor element. Strain gauges comprising conducting elements, the electrical resistance of which is affected by strain, are well known and will not be described here in detail. It will be appreciated that because they provide a variation in electrical resistance strain gauges also provide an analogue sensor output signal that varies with the measured parameter, which may be force, and that again the multi-channel filtering and linearisation can be provided as described above for the pressure gauges of FIGS. 1 and 2.

In a still further embodiment the transducer is a thermocouple or other thermal transducer arranged to output an electric signal that varies with a measured temperature. In this embodiment clearly the temperature compensation components are not appropriate. However otherwise the operation of the apparatus is substantially as for the pressure gauges described above.

It will be appreciated that various modifications can be made to the embodiments shown in the drawings, including without limitation the nature of the signal conditioning within each channel, the gains of the individual channels, the number of channels, the details of the switching between channels, the nature of the pressure gauge output and the method of selecting the optimum channel.

We claim:

1. A sensor apparatus comprising a sensor arranged to produce a sensor output signal that varies with a measured parameter, a plurality of output channels each arranged to receive the sensor output signal, the output channels each being optimized for a different range of the measured parameter, an analogue to digital converter (ADC) and at least one controller arranged to select one of the output channels and connect it to the ADC so as to produce a digital channel output, and an output module configured to generate an output reading from the digital channel output of the selected channel; wherein each of the output channels comprises an amplifier, each of the amplifiers has a gain, and the gain of the amplifier in each of the channels is different from that of the amplifiers of the other channels.

2. A sensor apparatus according to claim 1 wherein each of the output channels comprises a linearising module arranged to compensate for non-linearity between the output signal and the measured parameter.

3. A sensor apparatus according to claim 2 wherein each of the linearising modules provides different compensation from the other linearising modules.

4. A sensor apparatus according to claim 1 wherein each of the output channels comprises at least one filter.

5. A sensor apparatus according to claim 4 wherein the at least one filter of each of the output channels is different from the at least one filter of the other output channels.

6. A sensor apparatus according to claim 1 wherein each of the output channels comprises temperature compensation module arranged to compensate for variations in the output signal caused by variations in temperature.

7. A sensor apparatus according to claim 6 wherein the temperature compensation module of each of the channels is different from the temperature compensation modules of the other channels.

8. A sensor apparatus according to claim 1 wherein each of the channels is arranged to generate an analogue output and the ADC is connected between the analogue output and the output module.

9. A sensor apparatus according to claim 1 wherein each of the channels comprises an analogue section and a digital section.

10. A sensor apparatus according to claim 9 further comprising at least one switch arranged selectively to connect the ADC between the two sections of each of the channels.

11. A sensor apparatus according to claim 1 wherein the apparatus is a pressure gauge and the measured parameter is fluid pressure.

12. A sensor apparatus according to claim 1 wherein the apparatus is a load sensor.

13. A sensor apparatus according to claim 1 wherein the sensor comprises a piezoelectric element.

14. A sensor apparatus according to claim 1 wherein the sensor comprises a strain gauge.

15. A sensor apparatus comprising a sensor arranged to produce a sensor output signal that varies with a measured parameter, a plurality of output channels each arranged to receive the sensor output signal, the output channels each being optimized for a different range of the measured parameter, an analogue to digital converter (ADC) and at least one controller arranged to select one of the output channels and connect it to the ADC so as to produce a digital channel output, and an output module configured to generate an output reading from the digital channel output of the selected channel; wherein each of the output channels comprises temperature compensation module arranged to compensate for variations in the output signal caused by variations in temperature; and the temperature compensation module of each of the channels is different from the temperature compensation modules of the other channels.

16. A sensor apparatus comprising a sensor arranged to produce a sensor output signal that varies with a measured parameter, a plurality of output channels each arranged to receive the sensor output signal, the output channels each being optimized for a different range of the measured parameter, an analogue to digital converter (ADC) and at least one controller arranged to select one of the output channels and connect it to the ADC so as to produce a digital channel output, and an output module configured to generate an output reading from the digital channel output of the selected channel; wherein each of the channels comprises an analogue section and a digital section, and the apparatus further comprises at least one switch arranged selectively to connect the ADC between the two sections of each of the channels.

* * * * *